United States Patent
Moyer, Jr. et al.

(10) Patent No.: US 9,850,407 B2
(45) Date of Patent: Dec. 26, 2017

(54) ENHANCED ADHESIVE COMPOSITION FOR RE-ENFORCING JOINTS IN GYPSUM PANEL CONSTRUCTION

(71) Applicant: United States Gypsum Company, Chicago, IL (US)

(72) Inventors: Kevin W. Moyer, Jr., Park Ridge, IL (US); Pamela L. Hargrove, Cary, IL (US); Rafael Bury, Wheeling, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 0 days.

(21) Appl. No.: 15/214,617

(22) Filed: Jul. 20, 2016

(65) Prior Publication Data

US 2017/0066946 A1 Mar. 9, 2017

Related U.S. Application Data

(60) Provisional application No. 62/215,485, filed on Sep. 8, 2015.

(51) Int. Cl.

| | | |
|---|---|---|
| *E04B 1/68* | (2006.01) | |
| *C09J 131/04* | (2006.01) | |
| *C08L 31/04* | (2006.01) | |
| *C04B 26/04* | (2006.01) | |
| *C04B 26/06* | (2006.01) | |
| *C04B 26/16* | (2006.01) | |
| *C04B 111/00* | (2006.01) | |

(52) U.S. Cl.
CPC .......... *C09J 131/04* (2013.01); *C04B 26/04* (2013.01); *C04B 26/06* (2013.01); *C04B 26/16* (2013.01); *C08L 31/04* (2013.01); *E04B 1/6803* (2013.01); *C04B 2111/00637* (2013.01); *C04B 2111/00672* (2013.01); *C08L 2205/035* (2013.01); *C08L 2205/16* (2013.01); *C08L 2207/062* (2013.01)

(58) Field of Classification Search
CPC ... C09J 131/04; C08L 31/04; C08L 2207/062; C08L 2205/16; C08L 2205/035; E04B 1/6803; C04B 26/04; C04B 26/16; C04B 26/06; C04B 2111/00672; C04B 2111/637
See application file for complete search history.

(56) References Cited

U.S. PATENT DOCUMENTS

| | | | |
|---|---|---|---|
| 2,850,404 A | | 9/1958 | Dunlap |
| 3,891,582 A | | 6/1975 | Desmarais |
| 4,169,184 A | * | 9/1979 | Pufahl .............. C09J 7/0289 428/317.3 |
| 4,276,107 A | * | 6/1981 | Pufahl .............. C09J 7/0289 156/238 |
| 5,336,318 A | | 8/1994 | Attard et al. |
| 5,525,663 A | * | 6/1996 | Oien .............. C08G 18/12 523/218 |

(Continued)

FOREIGN PATENT DOCUMENTS

| | | |
|---|---|---|
| WO | WO2012005960 | 1/2012 |
| WO | WO2013110820 | 8/2013 |

*Primary Examiner* — Brent W Herring
(74) *Attorney, Agent, or Firm* — Greer, Burns & Crain, Ltd.; Pradip Sahu; Philip T. Petti

(57) ABSTRACT

This invention provides flexible adhesive compositions which can be used instead of joint reinforcement tape for securing a joint seam between abutting panels. Methods using the compositions are provided as well.

20 Claims, 10 Drawing Sheets

(56) References Cited

U.S. PATENT DOCUMENTS

| | | | | |
|---|---|---|---|---|
| 5,721,311 A * | 2/1998 | Oien | ............ | C08G 18/12 523/218 |
| 5,746,822 A | 5/1998 | Espinoza et al. | | |
| 5,753,747 A * | 5/1998 | Oien | ............ | C08G 18/12 156/330.9 |
| 6,316,088 B1 * | 11/2001 | Ogawa | ............ | C09J 7/0203 428/200 |
| 6,378,738 B1 | 4/2002 | Speaker et al. | | |
| 6,449,913 B1 * | 9/2002 | Shelton | ............ | B32B 3/16 52/390 |
| 6,491,677 B1 * | 12/2002 | Glaug | ............ | A61F 13/49466 604/385.01 |
| 6,573,327 B1 * | 6/2003 | Shibutani | ............ | C08F 2/20 524/557 |
| 6,610,769 B1 * | 8/2003 | Scott | ............ | B29B 17/02 156/244.24 |
| 6,668,897 B2 | 12/2003 | Gunn | | |
| 6,774,172 B1 * | 8/2004 | Nakamura | ............ | B60C 1/00 428/361 |
| 6,831,769 B2 * | 12/2004 | Holman | ............ | G02F 1/133305 156/250 |
| 7,678,847 B2 * | 3/2010 | Yan | ............ | C08K 9/10 428/343 |
| 7,691,761 B2 * | 4/2010 | Nandi | ............ | C08L 61/24 442/327 |
| 7,776,417 B2 * | 8/2010 | Mohseen | ............ | B32B 11/00 428/353 |
| 8,916,641 B2 * | 12/2014 | Hartz | ............ | C08G 18/0823 428/343 |
| 8,931,230 B2 | 1/2015 | Negri et al. | | |
| 2003/0025855 A1 * | 2/2003 | Holman | ............ | G02F 1/133305 349/86 |
| 2003/0136072 A1 * | 7/2003 | Peng | ............ | A61L 15/58 52/459 |
| 2003/0196753 A1 * | 10/2003 | Schoenfeld | ............ | C08G 18/672 156/330 |
| 2004/0001931 A1 * | 1/2004 | Izzi | ............ | B32B 3/30 428/40.1 |
| 2007/0021533 A1 * | 1/2007 | Yan | ............ | C08K 9/10 523/200 |
| 2008/0160854 A1 * | 7/2008 | Nandi | ............ | C08L 61/24 442/327 |
| 2010/0087116 A1 * | 4/2010 | Takahashi | ............ | C09J 7/045 442/151 |
| 2010/0092768 A1 * | 4/2010 | Neubert | ............ | B32B 7/06 428/337 |
| 2010/0147477 A1 * | 6/2010 | Nandi | ............ | C08L 61/24 162/164.6 |
| 2011/0034608 A1 | 2/2011 | Serre et al. | | |
| 2012/0021213 A1 * | 1/2012 | Hartz | ............ | C08G 18/0823 428/343 |
| 2012/0055105 A1 * | 3/2012 | Kohl | ............ | C08G 65/336 52/173.3 |
| 2012/0279755 A1 * | 11/2012 | Korthals | ............ | C09J 7/0207 174/135 |
| 2012/0282836 A1 * | 11/2012 | Korthals | ............ | C09J 7/0207 442/151 |
| 2012/0282837 A1 * | 11/2012 | Korthals | ............ | C09J 7/0207 442/151 |
| 2013/0156997 A1 * | 6/2013 | Muller | ............ | D06N 7/0063 428/87 |
| 2013/0168018 A1 * | 7/2013 | Casimiro | ............ | C09J 5/20 156/305 |
| 2014/0113126 A1 * | 4/2014 | Rowitsch | ............ | C09J 5/00 428/313.5 |
| 2014/0238602 A1 * | 8/2014 | Salminen | ............ | C09J 109/10 156/328 |
| 2014/0352887 A1 * | 12/2014 | Casimiro | ............ | C09D 5/20 156/305 |
| 2015/0037526 A1 * | 2/2015 | Seth | ............ | C09J 7/0217 428/41.3 |
| 2015/0263350 A1 * | 9/2015 | Kang | ............ | H01M 4/622 429/217 |
| 2015/0337534 A1 * | 11/2015 | Miller | ............ | E04D 5/148 52/309.3 |
| 2016/0304725 A1 * | 10/2016 | Tadych | ............ | C09D 5/18 |
| 2016/0333229 A1 * | 11/2016 | Korthals | ............ | C09J 7/0207 |
| 2016/0333230 A1 * | 11/2016 | Korthals | ............ | C09J 7/0207 |

\* cited by examiner

ENHANCED ADHESIVE COMPOSITION FOR RE-ENFORCING JOINTS IN GYPSUM PANEL CONSTRUCTION

REFERENCE TO RELATED APPLICATIONS

This application claims the benefit of priority to U.S. Provisional Patent Application 62/215,485 filed on Sep. 8, 2015, the entire disclosure of which is incorporated herein by reference.

TECHNICAL FIELD

This invention relates to construction materials and building construction methods. It provides flexible adhesive formulations suitable for fortifying joints between abutting panels in wall and ceiling assemblies. These flexible adhesive formulations can be used instead of joint reinforcement tape. Methods are also provided for assembling walls without joint reinforcement tape.

BACKGROUND

In building construction, different types of panels for forming interior and exterior walls and ceilings are used. Typically, the panels are in the form of boards (also referred to as panels) affixed to framing members such as in balloon framing arrangements known in the art. Examples include gypsum board faced with paper also known as wallboard or drywall, paperless gypsum panels prepared with fibrous mats (e.g., fiberglass), and the like. These and other types of boards are typically cut to appropriate dimensions and then fastened to framing members, e.g., with screws, nails, or the like to form wall sections formed from multiple boards.

Two side-by-side panels disposed in the same plane will form a joint seam between them on vertical walls and horizontal ceilings. In prior art, to finish the seam, joint reinforcement tape is embedded in the seam, along with a layer of joint compound under the tape, and multiple coats of joint compound applied over the tape. U.S. Pat. Nos. 2,850,404 and 6,668,897 relate to joint reinforcement tape and methods in which joint seams are finished with joint reinforcement tape.

Some panels meet at an angle such as when forming a corner. Reinforcement bead can be utilized to hide the corner seam and to protect the corner. Reinforcement bead can be directly attached to the panel using fasteners, or a layer of joint compound is applied under the trim to adhere the reinforcement bead to the panel. The installed reinforcement is then concealed with multiple layers of joint compound applied over the trim. Fasteners used to affix the panel to framing members must also be concealed with multiple layers of joint compound applied over them. After the various joint compound applications are dried, the resulting wall surfaces can be sanded and painted to form the desired uniform and aesthetically pleasing appearance. U.S. Pat. No. 8,931,230 to United States Gypsum Company discloses a method in which only one coat of joint compound is applied.

In gypsum drywall construction, paper tape is commonly used to bridge the seam between adjacent gypsum panels. The paper tape is embedded into joint compound, and then concealed by subsequent coats of joint compound to create a monolithic surface. The function of the tape in the system is to bridge the adjacent panels and to provide strength and reinforcement to the joint.

The taping operation involves several repetitive steps making it a time-consuming process in drywall finishing. One taping process is using a mechanical tool commonly referred to as a bazooka which is fitted with a roll of paper tape and filled with ready mixed joint compound which has been mixed with sufficient water so that the compound is fluid and flows easily. One of such applications is provided in U.S. Pat. No. 6,378,738. As the head of the bazooka is placed over the joint and moved down the wall, the tape advances and the backside is coated with a thin coat of joint compound which holds it loosely to the wallboard. A second worker will likely have to follow behind the bazooka wiping the tape tight to the wall and removing excess joint compound from over the tape. This operation occurs over every seam where gypsum panels are joined.

Aside from the tedium of the application process, if the joint compound does not flow evenly over the back side of the tape, blisters may occur which are often not seen until the taping coat is dry. In this case, a worker must cut the tape away from the joint and reapply a thin film of joint compound and piece of tape prior to moving on to the next step of finishing.

SUMMARY

This invention provides a flexible adhesive composition which eliminates the need for joint reinforcement tape as a reinforcement over a joint seam.

One embodiment provides a flexible adhesive composition comprising: fibers with the average length from 0.1 to 3 millimeters and a diameter from 5 microns to 25 microns, and selected from the group consisting of natural fibers, synthetic fibers and a combination thereof, wherein the fibers are in the amount from 0.1% to 25% by weight, based on the total composition weight; a binder, wherein the binder is a polymeric resin in the amount from 1% to 50% resin solids, based on the total composition weight; from about 25% to about 75% of water by weight, based on the total composition weight; and at least one thickener in the amount from about 0.1% to about 2% by weight, based on the total composition weight; and wherein the composition has a viscosity in the range from about 200 to about 600 Brabender units and a pH in the range from about 7.0 to about 12.

In some other embodiments, the flexible adhesive composition further comprises a filler with a particle size in the range from 0.2 microns to 250 microns and selected from the group consisting of calcium carbonate, limestone, gypsum, nepheline syenite, titanium dioxide, lithophone, wollastonite, bismuth oxychloride, talc, clay, and any mixture thereof, and wherein the filler is in the amount from 0.5% to 75% by weight, based on the total composition weight.

Various fibers are suitable for preparing the present flexible adhesive composition, including fibers selected from the group consisting of polypropylene fibers, polyethylene fibers, rayon fibers, and any combination thereof.

In some embodiments, the present flexible adhesive composition is prepared with high-density polyethylene fibers, rayon denier fibers or the combination of the two fibers.

In some embodiments, fibers have the average length from 0.5 to 1.5 millimeters.

At least in some embodiments, the polymeric resin is a film-forming polymer selected from the group consisting of ethylene vinyl acetate, styrene/acrylic polymers, acrylic polymers, polyurethane polymers, vinyl/acrylic polymers, and any mixture thereof.

In further embodiments for the present flexible adhesive composition, the binder is a latex resin and the composition further comprises a coalescent solvent.

At least in some embodiments, the thickener is selected from the group consisting of cellulosic thickeners, gelling clays, associative thickeners and any combination thereof.

The present flexible adhesive composition may further comprise at least one biocide in the amount from about 0.05% to about 0.2% by weight, based on the total composition weight.

Further embodiments are directed to a wall assembly comprising of two panels which are joined together side-by-side and thereby create a joint seam and the present flexible adhesive composition being applied over the joint seam. At least some of the assemblies do not include joint reinforcement tape.

Further embodiments provide a method for affixing and holding two panels together at a joint seam, comprising a step of creating a joint seam by positioning two panels side-by-side such that the panels abut; and a step of applying the flexible adhesive composition of claim 1 to the joint seam and some panel surface area around the seam. At least some embodiments, the method is performed without joint reinforcement tape. At least in some embodiments, the present flexible adhesive composition is spray-applied.

BRIEF DESCRIPTION OF THE DRAWINGS

FIG. 3B depicts the sheer test being performed on an assembly with the present flexible adhesive composition, while FIG. 3D depicts the sheer test being performed for a control assembly with joint reinforcement tape, while

FIG. 4B depicts an assembly with the present flexible adhesive composition after the extension test has been performed, while

DETAILED DESCRIPTION

This invention provides a flexible adhesive composition which is self-leveling and can be used to fortify a joint between two abutting panels. The flexible adhesive composition eliminates the need for joint reinforcement tape.

Figure 1:
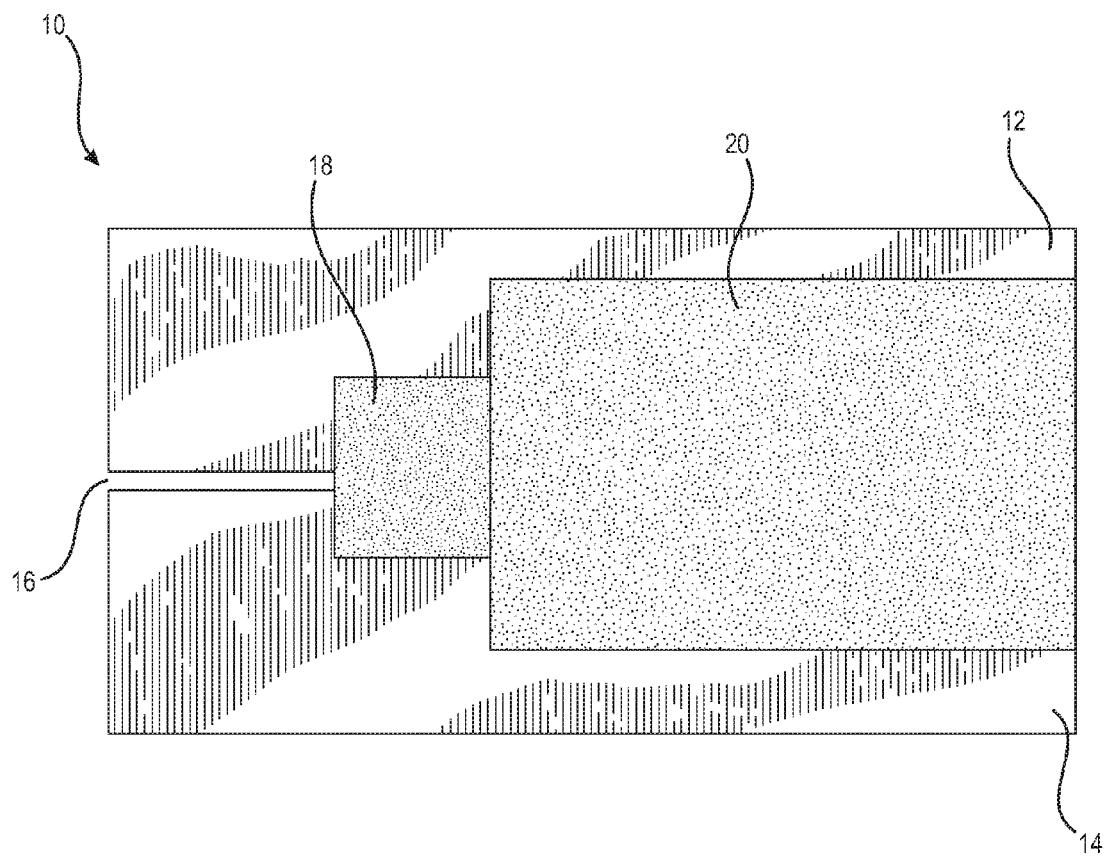
FIG. 1 depicts a conventional wall assembly in which joint reinforcement tape is used over a seam between two abutting panels, as provided by prior art.

As shown in FIG. 1, a prior art wall or ceiling assembly, generally 10, aligns a first panel 12 and a second panel 14 side-by-side. This results in a joint seam 16 between the abutting panels 12 and 14. In conventional methods, the joint seam 16 is covered with joint reinforcement tape 18 which adheres to the panels 12 and 14 with some joint compound applied to the seam prior to the tape application. Several coats of a joint compound 20 are then applied on top of the tape to smoothen and even the joint seam 16 and prepare a wall for painting.

Figure 2:
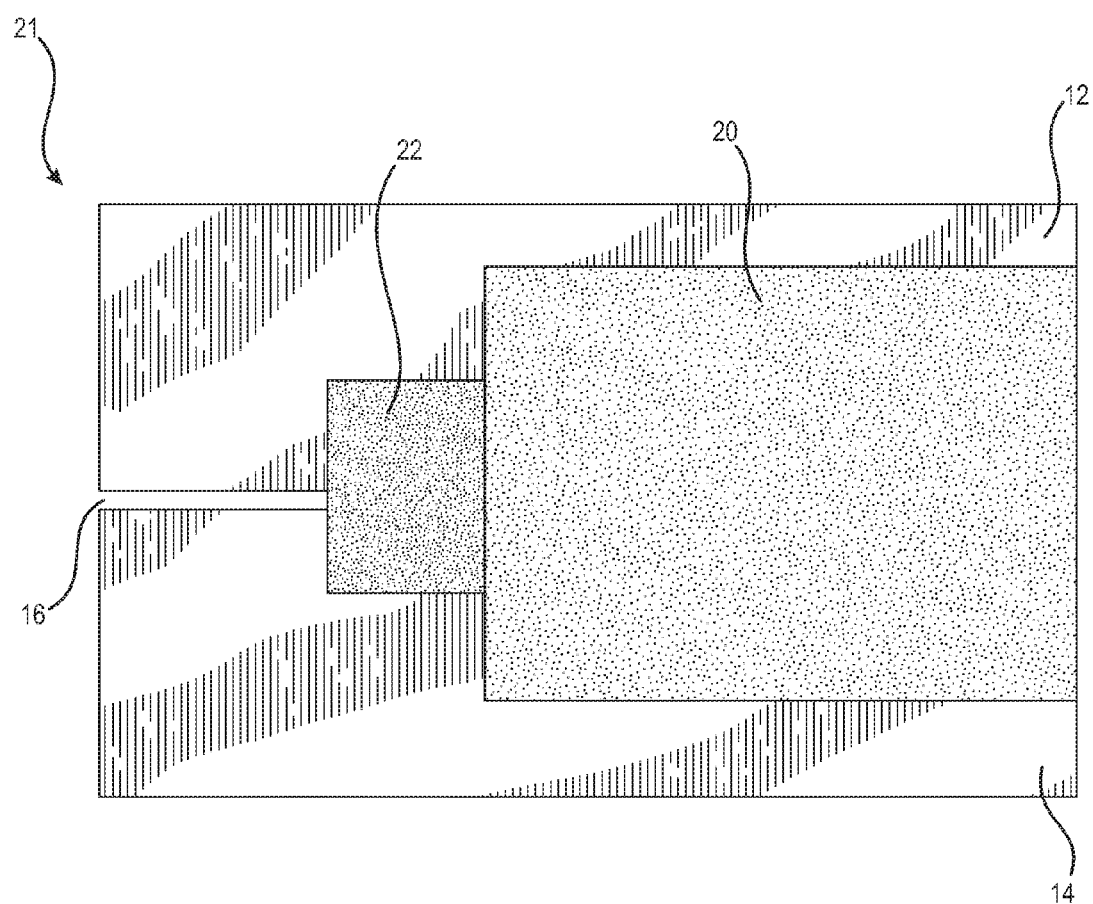
FIG. 2 depicts a wall assembly in which the present flexible adhesive composition is used instead of joint reinforcement tape.

FIG. 2 depicts a two-panel assembly with the present flexible adhesive composition, generally 21. In this assembly, a first panel 12 and a second panel 14 are brought together side-by-side to abut and create a joint seam 16. Unlike the conventional assembly with the joint reinforcement tape 18 shown in FIG. 1, no joint reinforcement tape 18 is applied over the joint seam 16 in the assembly 21 of FIG. 2. Instead, the present flexible adhesive composition 22 is applied over the joint seam 16 such that the present flexible adhesive composition fills the seam and also covers some panel surface around the seam 16, as shown in FIG. 2. At least one coat of a joint compound 20 is then applied over the present flexible adhesive composition 22 after the present flexible adhesive composition 22 dries and forms a polymeric film.

The present flexible adhesive composition 22 fills in a joint seam 16 and covers some of the panel 12 and 14 surface on each side of the seam, as shown in FIG. 2 and has self-leveling properties. The present flexible adhesive composition can be applied by traditional methods such as for example by using drywall finishing knives or more efficiently the present flexible adhesive composition can be spray-applied over panel joints.

The flexible adhesive composition is easier to use, faster to apply and provides the smooth appearance needed for an even finish of an interior wall.

Further embodiments provide methods in a joint finishing process to affix and hold two panels together at a joint seam and to reinforce the joint seam. The present flexible adhesive composition is compatible with a great variety of joint compounds, panels and wall installation systems, including such joint compounds and wall assemblies as provided in U.S. Pat. No. 8,931,230.

The present flexible adhesive composition includes fibers. Suitable fibers are natural fibers, synthetic fibers, or a combination of natural and synthetic fibers. The fibers are used in loading levels sufficient to reinforce a joint between two abutting panels.

Some of the suitable synthetic fibers include, but are not limited to, acrylic, vinylon, DERCLON™, carbon, aramid, high-density polyethylene, nylon, modacrylic, glass, metallic, DYNEEMA™, polybenzimidazole, triacetate, rayon, diacetate, VINYON™, LYOCELL™, acetate, polylactic, basalt, olefin, ORLON™, polyethylene, SARAN™, ZYLON™, spandex and VECTRAN™ fibers. Some of the suitable natural fibers include, but are not limited to, cellulosic fibers, plant (cotton, coir, hemp, etc.), wood and animal fibers.

In some embodiments, a combination of different fibers can be used. In some embodiments, a combination of polyethylene fibers with polypropylene fibers is used. In further embodiments, rayon fibers can be used. At least in some embodiments, a combination of polyethylene fibers with rayon denier fibers is used. In other embodiments, a combination of polypropylene fibers with rayon denier fibers is used. In further embodiments, a combination of polyethylene fibers with polypropylene fibers with rayon denier fibers is used. Further embodiments include those in which high-density polyethylene fibers are used.

Fibers can be used in any suitable amount sufficient to reinforce a joint between two abutting panels. In some embodiments, the amount of fibers is in the range from 0.1% to 25% by weight, based on the total composition weight. In other embodiments, the amount of fibers is in the range from 1.0% to 20% by weight, based on the total composition weight. In other embodiments, the amount of fibers is in the range from 1.0% to 15% by weight, based on the total composition weight. In further embodiments, the amount of fibers is in the range from 2.5% to 10% by weight, based on the total composition weight.

Fibers of different size can be used. Generally, fibers with the average length from 0.1 to 3 millimeters are suitable. In some embodiments, the fibers are from 0.5 to about 1.5 millimeters in length. The diameter of fibers can vary. Generally, fibers with a diameter in the range from 5 microns to 25 microns. At least in some embodiments, fibers have a diameter from 10 to 20 microns.

Another component of the present flexible adhesive composition is a binder. In some embodiments, the binder is a polymeric resin. In some embodiments, the polymeric resin is present in amounts from about 1% to about 50% resin solids, based on the total composition weight.

At least one preferred embodiment includes from about 25% to about 35% latex emulsion by weight of the composition. In some embodiments, the latex is selected to be a film-forming polymer. Examples of the latex emulsion include, but are not limited to, ethylene vinyl acetate, styrene/acrylic polymers, acrylic polymers, polyurethane polymers, vinyl/acrylic polymers and mixtures thereof.

The polymeric resin can be any suitable film-forming resin capable of forming a solid film or binding pigments. Suitable polymeric resins include, but are not limited to, latex emulsion media and oil-based media. In some embodiments, the polymeric resin is selected from vinyl acetates, such as ethylene vinyl acetate, and acrylics, such as vinyl acrylics and styrenated acrylics. Suitable oil-based media include carboxyl- and hydroxyl-functionalized acrylics, alkyds, polyurethanes, polyesters, and epoxies. The initial solid composition typically comprises a polymeric binder in the amount from about 5 wt. % to about 50 wt % by weight of the composition.

Useful polymeric resins include acrylic polymers, vinyl acrylic polymers, for example, vinyl acetate-butyl acrylate copolymers, styrene acrylic polymers, and vinyl acetate polymers, including vinyl acetate polymers marketed under the UCAR® and NEOCAR® trade names (The Dow Chemical Company, Midland, Mich.) such as UCAR® 367 brand latex adhesive; emulsion polymer products, including emulsion polymer products marketed under the VINREZ® name (Halltech, Inc., Ontario, Canada); acrylic, vinyl acrylic, and styrene acrylic latex polymers, including those marketed under the AQUAMAC® trade name (Hexion Specialty Chemicals, Columbus, Ohio). An exemplary vinyl acrylic resin is TurCOR® 3025 from Celanese, which has a glass temperature at about 30° C. and is 56% solids.

Suitable functionalized acrylics, alkyds, polyurethanes, polyesters, and epoxies are also useful as polymeric resins and can be obtained from a number of commercial sources. Useful acrylics are sold under the ACRYLOID® name (The Dow Chemical Company, Midland, Mich.); useful epoxy resins are sold under the EPON® name (Hexion Specialty Chemicals, Ohio); useful polyester resins are sold under the CYPLEX® trade name (Cytec Industries, West Paterson, N.J.); and useful vinyl resins are sold under the UCAR® name (The Dow Chemical Company, Midland, Mich.).

Starches are not considered to be polymeric resins, but they can also be added as a co-binder or be used as a sole binder in some embodiments.

At least in some embodiments, the present flexible adhesive composition comprises a filler. The filler can be selected from calcium carbonate, limestone, gypsum, nepheline syenites, titanium dioxides, lithophones, wollastonites, bismuth oxychlorides, talc, clays and any mixtures thereof.

Useful nepheline syenites are typically nodular particles. A suitable nepheline syenite is marketed under the trade name MINEX® (e.g., MINEX® 3) (Unimin Corporation, New Caanan, Conn.). At least in some embodiments, the present flexible adhesive composition comprises a combination of at least two fillers.

In further embodiments, only one first filler is used. Nepheline syenites can be used as a first or the only filler. Other suitable fillers include, but are not limited to, talc, including talc marketed under the MISTRON® trade name including MISTRON® ZSC (Luzenac North America, Greenwood Village, Colo.); ground calcium carbonates, including ground calcium carbonate marketed under the OMYACARB® trade name including SNOWWHITE® 21 and OMYACARB® 6-PT (Omya North America, Alpharetta, Ga.); calcined kaolin clays, including kaolin clays marketed under the HUBER® trade name including HUBER® 70-C (Huber Engineered Materials, Atlanta, Ga.); hydrous aluminosilicates, including hydrous aluminosilicates marketed under the ASP® trade name including ASP-400 (BASF Corporation, Florham Park, N.J.); precipitated calcium carbonates, including precipitated calcium carbonates available under the M-60® trade name (Mississippi Lime Company, St. Louis, Mo.); and micas, including micas available under the P-80F trade name (United States Gypsum Company, Chicago, Ill.).

Preferred filler particles are smaller than 250 microns. The technical advantage to keep the particle size under 250 microns is this size avoids producing grit while the present flexible adhesive composition is applied to a seam. In some embodiments, the filler particle size is in the range from about 0.2 microns to about 250 microns. A preferred embodiment has a filler with a particle size distribution from about 10 microns to about 30 microns.

The amounts of the filler preferably range from about 5% to about 15% by weight, based on the total composition weight, but can be in the range from 0.5% to 75% by weight, based on the total composition weight in some embodiments.

In some embodiments, the present flexible adhesive composition further optionally comprises a coalescent solvent. If the polymeric resin is a latex resin, the coalescent solvent is selected to support film formation of the polymeric resin. In this case, the coalescent solvent is selected based on the glass transition temperature of the polymeric resin and the desired drying time to form the film.

In some embodiments, selection of the coalescent solvent is determined by the type and amount of the polymeric resin selected for a particular application. An example of a coalescent solvent for use with styrene/acrylic polymers is TEXANOL® brand ester alcohol by Eastman Chemical Co., Kingsport, Tenn.

The present flexible adhesive composition in some embodiments comprises a coalescent solvent in an amount from 0.2% to 8% by weight, based on the total composition weight. The volatile content may limit the amount of a coalescent solvent that can be used, but it is anticipated that higher coalescent solvent content may be useful in some applications.

Water is added to the present flexible adhesive composition in amounts sufficient to form a workable composition. Preferred embodiments include water in amounts from about 25% to about 75% by weight, based on the total composition weight. The present flexible adhesive composition is sufficiently thick to remain in place on a wall or ceiling until dry, and sufficiently thin to be applied. Some of the tools that can used for applying the present flexible adhesive composition include, but are not limited to, application by spraying, by an automatic taping tool, or by a knife, brush, trowel, roll, or an extrusion devise.

Viscosity of the present flexible adhesive composition is adjusted with thickeners. In order to create the right rheology on a substrate, such as an interior wall or ceiling, the present flexible adhesive composition is sufficiently thin to be applied by the tool, and thick enough to stay in place on the wall until it dries. Some embodiments of the present flexible adhesive composition include an amount of thickener to produce a Brabender viscosity in the range 200-600 units. Suitable thickeners include, but are not limited to, cellulosic thickeners, gelling clays, associative thickeners or any combinations thereof. At least one preferred embodiment uses a thickener in amounts from about 0.1% to about 2% by weight, based on the total weight of the present flexible adhesive composition.

In some embodiments, a combination of several thickeners can be used. In some embodiments, the total amount of all thickeners is the range from about 0.01% to about 15% by weight, based on the total composition weight.

At least some embodiments use hydroxyl methyl cellulose, including hydroxyl methyl cellulose marketed as NATROSOL® by Ashland Inc, Covington, Ky. Other thickeners may be suitable depending on the exact application. Suitable hydrophobic modified cellulosic thickeners include, but are not limited to, cellulose ethers having a molecular weight between about 1000 Daltons and 500,000 Daltons. In some embodiments, a cellulosic thickener is at least one of the following: alkyl hydroxypropyl cellulose ethers, hydroxypropyl methyl celluloses, xanthan gums, carboxymethylcelluloses, hydroxyethylcelluloses, sodium alginates and other salts of alginic acid, carrageenans, gum arabic, gum tragacanth, gum ghatti, guar gum and its derivatives, locust bean gum, tamarind gum, psyllium seed gum, quince seed gum, larch gum, pectin and its derivatives, dextrans, and hydroxypropylcelluloses.

In some embodiments, the present flexible adhesive composition comprises from about 0.01 wt. % to about 2 wt % of the cellulosic thickener, based on the total weight of the present flexible adhesive composition.

The alkyl group of useful alkyl hydroxypropyl celluloses may contain up to 9 carbon atoms, but usually the alkyl group contains from one to three atoms. Hydroxypropyl methyl celluloses having an average of about two hydroxypropyl and/or methoxypropyl groups per anhydroglucose unit are often used. The viscosity of an aqueous solution containing about 2 wt. % of a suitable alkyl hydroxypropyl cellulose ether at 20° C. is about 60,000 centipoises (cps) to about 90,000 cps as measured with an Ubbelohde tube capillary viscometer. Alternatively, similar measurements can be made with a Brookfield rotational viscometer at a speed between about 2.5 rpm and 5 rpm.

In one embodiment, the present flexible adhesive composition contains about 0.25 wt. % of an alkyl hydroxypropyl cellulose ether, based on the total composition weight. Suitable alkyl hydroxypropyl cellulose ethers include those marketed under the METHOCEL® trade name (The Dow Chemical Company, Midland, Mich.).

Suitable gelling clays for use in the present flexible adhesive compositions are hormite clays comprising natural and/or synthetic dimensionally layered sheet structures of tetrahedrally coordinated silica linked to parallel sheets of octahedrally coordinated alumina, magnesium oxide, silicates, and/or phyllosilicates. Such gelling clays include, but are not limited to, attapulgites, sepiolites, bentonites, laponites, nontronites, beidellites, laponites, yakhontovites, zincsilites, volkonskoites, hectorites, saponites, ferrosaponites, sauconites, swinefordites, pimelites, sobockites, stevensites, svinfordites, vermiculites, water-swellable synthetic clays, smectites, e.g., montmorillonites, particularly sodium montmorillonite, magnesium montmorillonite, and calcium montmorillonite, illites, mixed layered illite/smectite minerals such as rectorites, tarosovites, and ledikites, magnesium aluminum silicates, and admixtures of the clays named above. Palygorskite attapulgite clays are generally preferred.

In some embodiments, the present flexible adhesive composition comprises from about 0.01 wt. % to about 3 wt % of the gelling clay, based on the total composition weight. Useful gelling clays include those marketed under the MIN-U-GEL® trade name (Floridin Company, Quincy, Fla.), and those marketed under the Attagel® trade name (Engelhard Corporation, Iselin, N.J.). Such clays are available in different particle sizes.

Suitable associative thickeners for use in the present flexible adhesive composition include hydrophobically modified ethoxylated urethanes (HEUR), hydrophobically modified alkali-swellable emulsions (HASE), and styrene-maleic anhydride terpolymers (SMAT). HEUR thickeners (also generally known as polyurethane or PUR associative thickeners) are generally preferred in aqueous, latex-based compositions. Acidic acrylate copolymers (cross-linked) of ethyl acrylate and methacrylic acid, and acrylic terpolymers (cross-linked) of ethyl acrylate, methacrylic acid, and non-ionic urethane surfactant monomer may also be used as associative thickeners.

When one or more suitable associative thickeners are used, the thickening reaction is caused in part by either association between the associative thickener and at least one other particle of the present flexible adhesive composition (e.g., a pigment particle or resin particle) or another associative thickener molecule. In various embodiments, the initially solid-colored present flexible adhesive composition typically comprises from about 0.01 wt. % to about 10 wt. % of the associative thickener, based on the total composition weight. Useful associative thickeners include those marketed under the ALCOGUM® trade name (Alco Chemical Company, Chattanooga, Tenn.), the VISCALEX® trade name (Ciba Specialty Chemicals, Tarrytown, N.Y.), and the ACRYSOL® trade name (The Dow Chemical Company, Midland, Mich.). In some embodiments, CARBOPOL® EZ-3 from (Lubrizol, Wickliffe, Ohio) is used as a co-thickener.

In some embodiments, the present flexible adhesive composition comprises a biocide. When the present flexible adhesive composition is prepared and used in a short amount of time, it is not necessary to utilize a biocide. However, when commercial products are packaged and allowed to remain on a store shelf for weeks or months, microbes can flourish in an environment that is dark, moist and contains nutrients supplied by the polymeric resin and other materials. It then becomes necessary to add a biocide to inhibit growth of bacteria and molds within the container. Any biocide can be used in the present flexible adhesive composition that is suitable for use in building panels, coatings or other products that are likely to come into contact with people or pets.

Products known for use as fungicides and/or in-can preservatives in aqueous systems are particularly useful in the present flexible adhesive composition. Suitable fungicides include MERGAL® 174 preservative (Troy Corp., Florham Park, N.J.). Another example of a suitable biocide is a salt of pyrithione. Any water-soluble salt of pyrithione having antimicrobial properties is useful in the present gypsum panel. Pyrithione is known by several names, including 2 mercaptopyridine-N-oxide; 2-pyridinethiol-1-oxide (CAS Registry No. 1121-31-9); 1-hydroxypyridine-2-thione and 1 hydroxy-2(1H)-pyridinethione (CAS Registry No. 1121-30-8). The sodium derivative ($C_5H_4NOSNa$), known as sodium pyrithione (CAS Registry No. 3811-73-2), is one embodiment of this salt that is particularly useful. Pyrithione salts are commercially available from Arch Chemicals, Inc. of Norwalk, Conn., such as Sodium OMADINE® or Zinc OMADINE® brand antimicrobial compound.

Other preferred biocides include diidomethyl-4-tolylsulfone; thiabendazole, tebuconazole, 3-iodo-2-propynyl butylcarbamate and combinations thereof. MERGAL® brand biocides (Troy Corp., Florham Park, N.J.) are specific examples of a 3-iodo-2-propylyl butylcarbamate that are useful in the decorative composition. An example of a preferred fungicide is FUNGITROL® 920 brand antimicrobial agent from International Specialty Products, Inc., Wayne, N.J.

The amount of biocide used is in the range needed to prevent growth of microbes over the shelf life of the present flexible adhesive composition. When in-can preservatives are used as a biocide, amounts in the range of about 0.1% to about 0.3% biocide are used, based on the total composition weight. At least one preferred embodiment uses a biocide in amounts of about 0.05% to about 0.2% by weight, based on the total composition weight.

In some embodiments, the present flexible adhesive composition may further comprise at least one of the following: a surfactant, colorant, humectant, defoamer and/or a pH stabilizer.

In some embodiments, the present flexible adhesive composition also comprises at least one surfactant. For example, in some embodiments, the surfactant can be a surfactant having a hydrophilic-lipophilic balance (HLB) from about 3 to about 20, such as from about 4 to about 15 or from about 5 to about 10. The surfactant can be present in any suitable amount, such as from about 0.001% to about 15% by weight of the wet composition, such as from about 0.001% to about 10%, from about 0.001% to about 5%, or from about 0.01% to about 0.5%, by weight of the wet composition.

In some embodiments, the present flexible adhesive composition may further comprise at least one dispersant. Suitable dispersants include amine based dispersants such as a multifunctional amine marketed under the AMP® trade name (Angus, Inc.).

The present flexible adhesive composition may further comprise at least one humectant. Any suitable humectants can be included, such as, for example, sorbitol derivatives, polyhydric alcohols, including but not limited to glycols such as ethylene glycol, diethylene glycol (DEG), triethylene glycol, propylene glycol, di-propylene glycol, and/or tri-propylene glycol, glycerol or any combination thereof. If included, the humectants can be included in an amount from about 0.001% to about 15% by weight of the wet composition, such as from about 0.001% to about 10%, from about 0.01% to about 5%, or from about 0.001% to about 3%, by weight of the wet composition.

The present flexible adhesive composition has a pH in the range from about 7.0 to about 12. In some embodiments, the adhesive composition has a pH in the range from about 8.0 to about 12. In some embodiments, the present flexible adhesive composition has a pH in the range from about 9.0 to about 12.

A variety of basic materials may be used in the present flexible adhesive composition to adjust the pH as needed. Such basic compounds include, but are not limited to ammonia, caustic soda (sodium hydroxide), tri-ethylamine (TEA), and 2-amino-2-methyl-1 propanol (AMP). In various embodiments, the present flexible adhesive composition comprises about 0.001 wt. % to about 10 wt. %, about 0.01 wt. % to about 0.5 wt. %, and/or about 0.01 wt. % to about 0.50 wt. % of the alkaline/basic material.

In some embodiments, the present flexible adhesive composition is formulated as listed in Table 1 below.

TABLE 1

Flexible Adhesive Composition

| Component | Amount (% by weight, based on the total composition weight) |
|---|---|
| Solvent (Water) | 25-75 |
| Fibers | 0.1-25 |
| Cellulosic Thickener | 0-3 |
| Gelling Clay Thickener | 0-3 |
| Associative Thickener | 0-3 |
| Surfactant | 0-3 |
| Humectant | 0-5 |
| Filler | 0-75 |
| Defoamer | 0-1 |
| Biocide | 0-0.3 |
| Coalesent Aid | 0-8 |
| Binder | 1-50 |
| pH adjuster/stabilizer | 0-1 |

At least in some embodiments, the present flexible adhesive composition can be formulated as shown in Table 2 below.

TABLE 2

Exemplary Flexible Adhesive Composition

| Component | Chemical Name/Exemplary Trade Name | Amount (% by weight, based on the total composition weight) | Preferred Amount (% by weight, based on the total composition weight) |
|---|---|---|---|
| Solvent (Water) | Water | 25-75 | 53.4% |
| Fibers | Synthetic fibers (FIBERS short stuff E505F$^R$) | 0.1-25 | 5% |
| 1$^{st}$ Thickener | Hydroxyethylcellulose (NATROSOL 250HHXR$^R$) | 0-3 | 0.39% |
| 2$^{nd}$ Thickener | Polyacrylate thickener (CARBOPOL EZ-3$^R$) | 0-3 | 0.32% |
| 3$^{rd}$ Thickener | Attapulgite clay (MIN-U-GEL FG$^R$) | 0-3 | 0.55% |
| Surfactant | C-12-C14 tert-alkylamine (TRITON CF-10$^R$) | 0-3 | 0.32% |
| Humectant | Glycerin | 0-5 | 0.13% |
| Filler | Kaolin Clay (ASP$^R$ 400) | 0-75 | 0.13% |
| Defoamer | Petroleum distillate (DEE FO$^R$ 542) | 0-1 | 0.17% |
| Biocide | 2((hydroxymethyl)amino)ethanol (MERGEL$^R$ 174) | 0-0.3 | 0.17% |
| Coalesent Aid | 2,2,4-Trimethyl-1,3-Pentanediol Mono(2-methylpropanoal) (TEXANOL$^R$) | 0-8 | 0.44% |
| Binder | Polyvinyl Acetate (TurCOR$^R$ 3025) | 1-50 | 28.92% |
| pH adjuster/ stabilizer | 2-Amino-2-Methyl-1-Propanol (AMP$^R$-95) | 0-1 | 0.56% |

It has been unexpectedly discovered that the present flexible adhesive composition can be used for fortifying joints between abutting panels. When the present flexible adhesive composition is used for filling a joint seam and a surrounding panel area around the joint, the need for joint reinforcement tape is eliminated and the joint seam can be finished without joint reinforcement tape.

In building construction, a joint between two abutting panels must be enforced such that the joint can withstand pressure in a wall without cracking or dislocating. Various tests can be conducted to determine the strength of a finished joint. One of the tests, referred to as the sheer test, is shown in FIG. 3A.

Figure 3A:
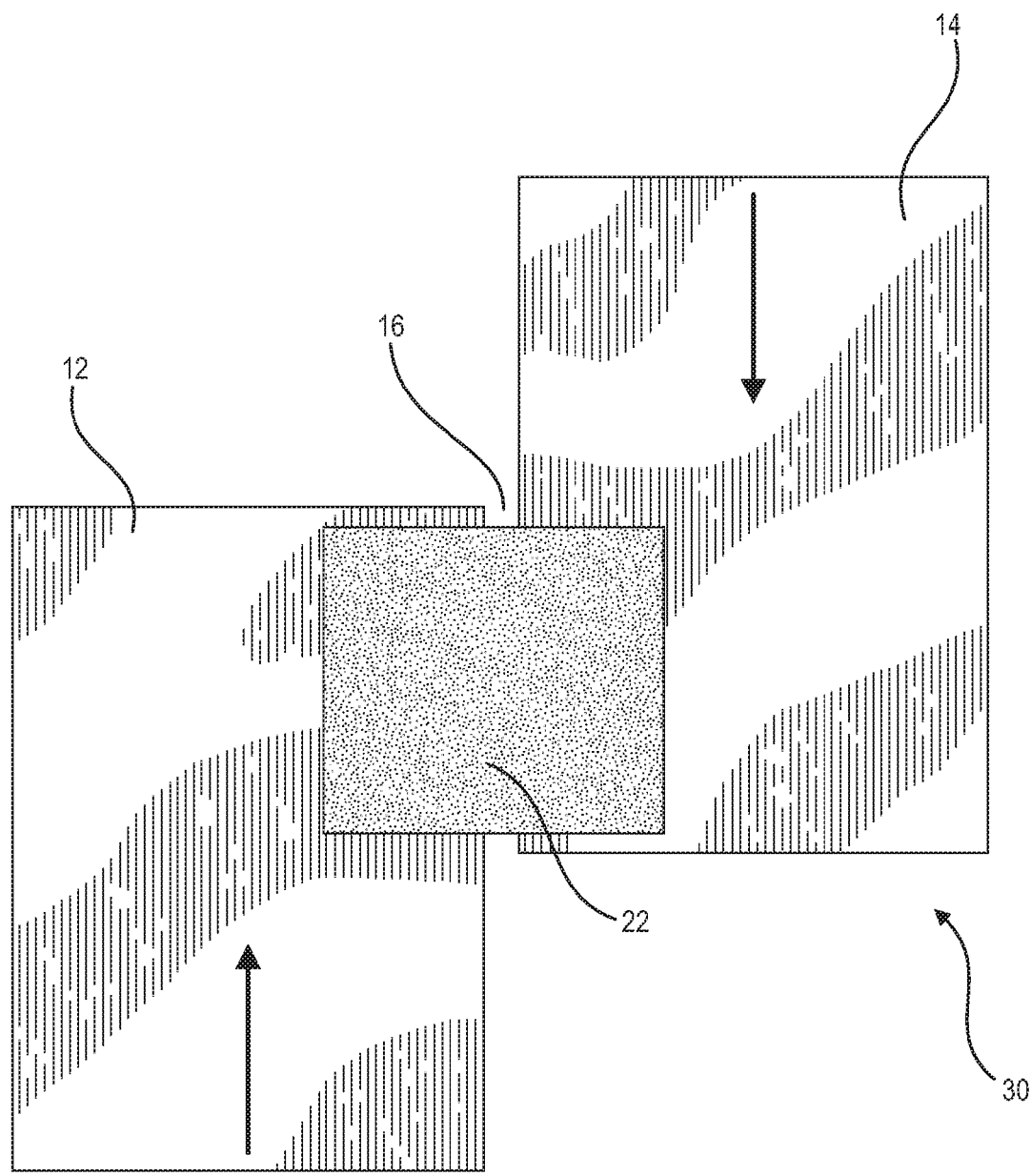
FIG. 3A is a schematic of the sheer test step up.

In the sheer test, two panels, a first panel 12 and a second panel 14 are joined together side-by-side, as shown in FIG. 3A. This creates a joint seam 16 between the abutting panels 12 and 14. The joint seam 16 is then filled with either the present flexible adhesive composition 22 or taped with joint reinforcement tape (not shown in FIG. 3A) instead of the present flexible adhesive composition 22, as a control. The resulting two-panel assembly, generally 30 in FIG. 3A is then allowed to dry and is placed in an Universal Test Machine (UTM) which is then slowly pushes the panels 12 and 14 toward each other until the panels are dislocated because of the joint seam failure. The UTM measures and reports the amount of force (load) needed to dislocate the panels. Thus, the strength of the joint seam and a maximum load for the seam before the seam fails can be calculated using the data obtained in the sheer test.

Figure 3B:
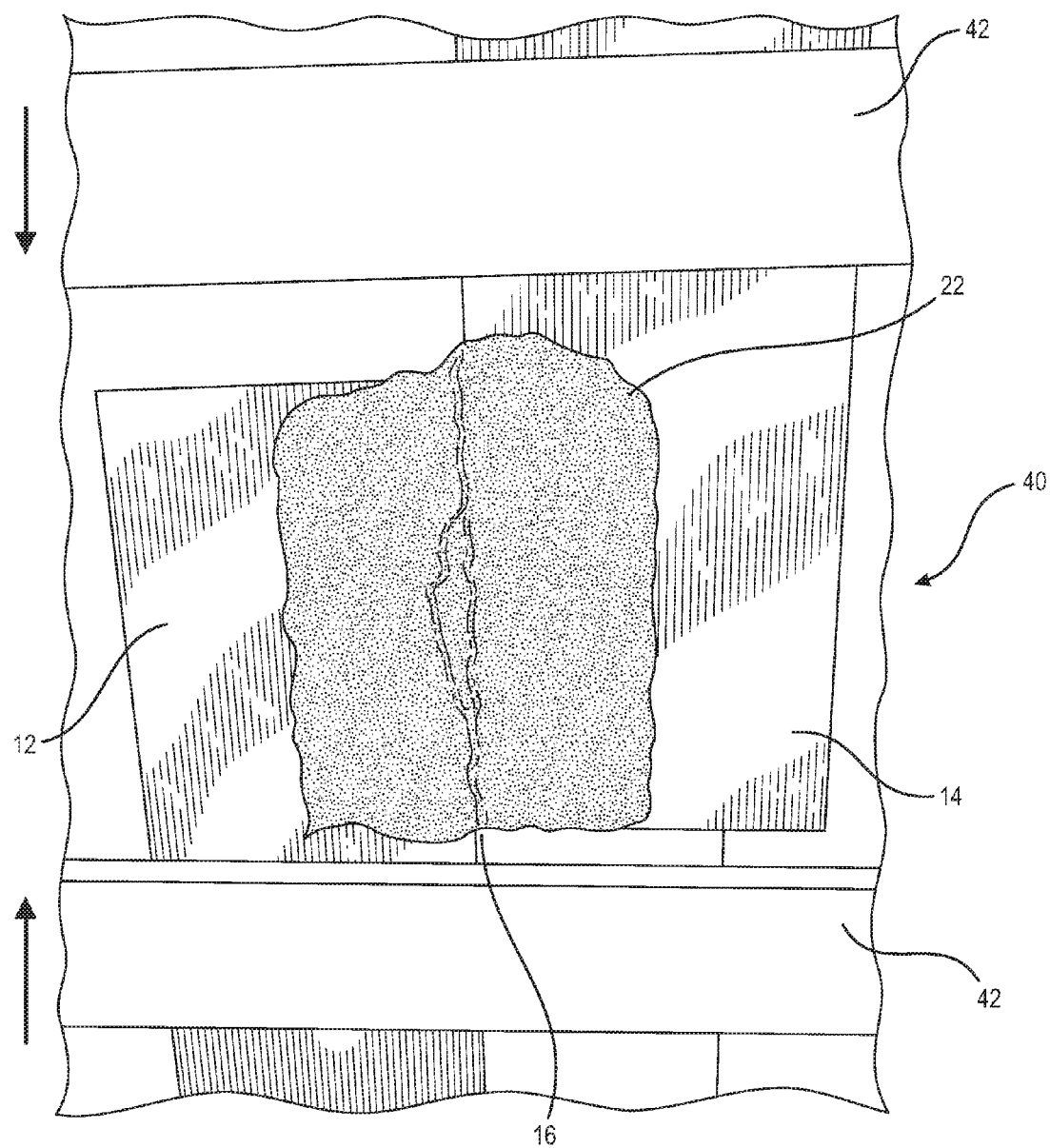
Figure 3C:
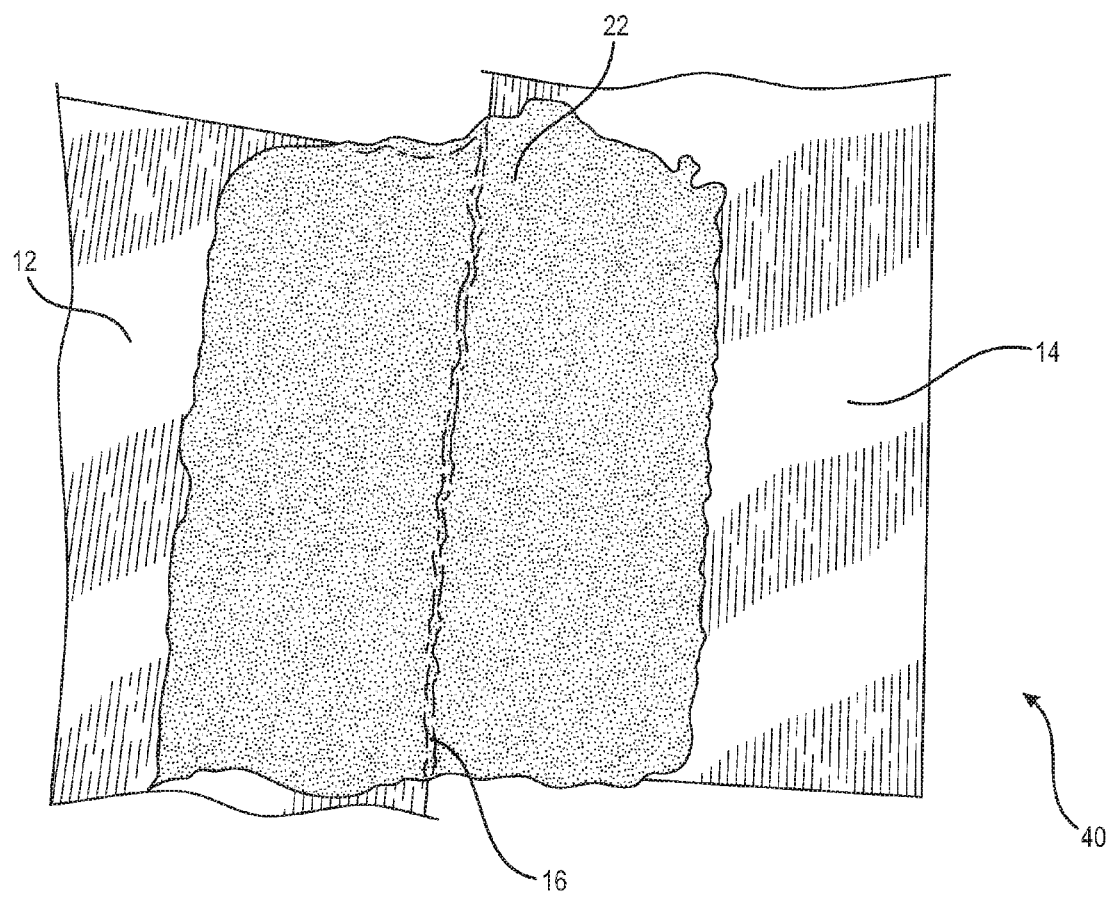
FIG. 3C depicts the assembly of FIG. 3B after failing.
Figure 3D:
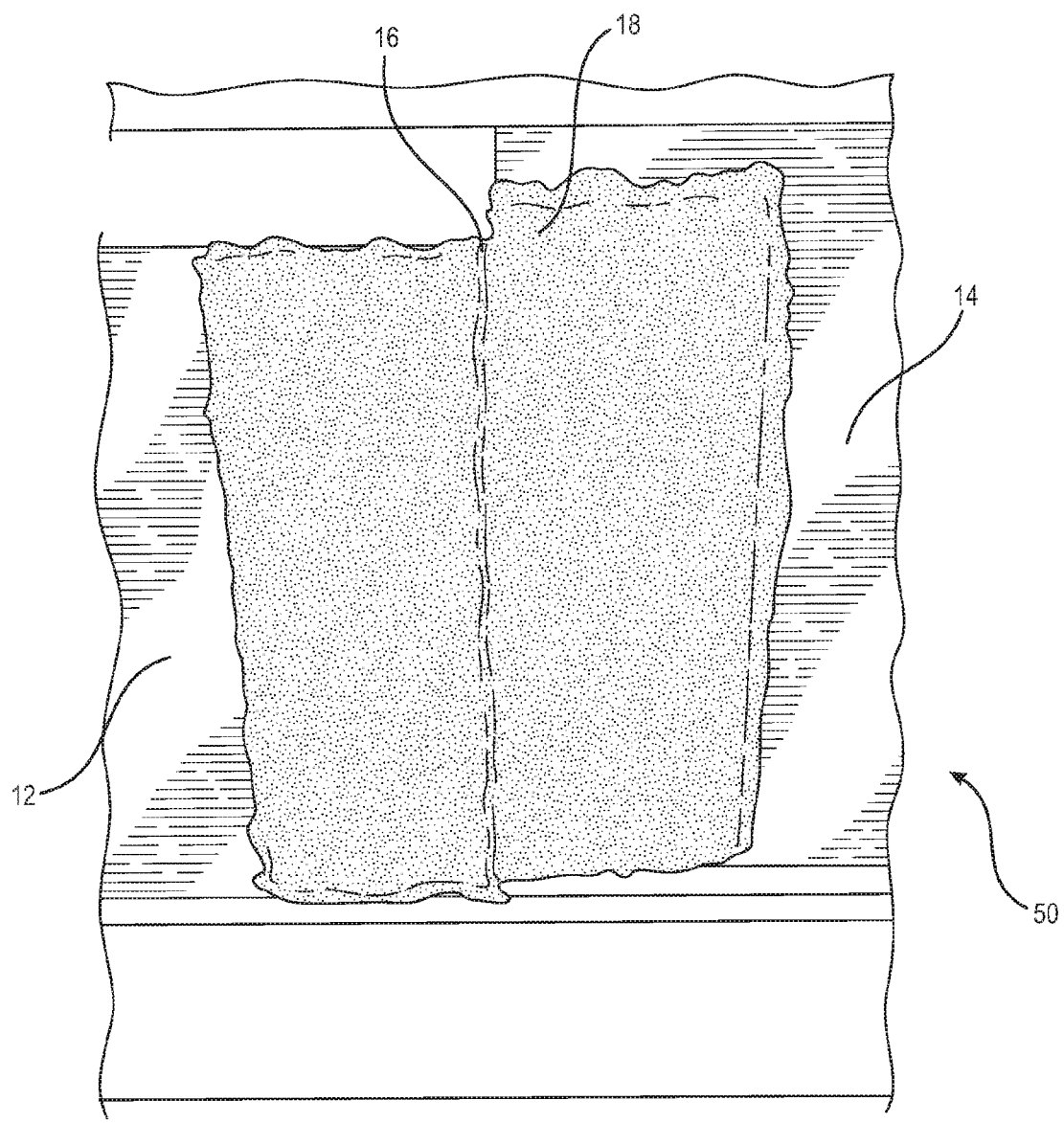
Figure 3E:
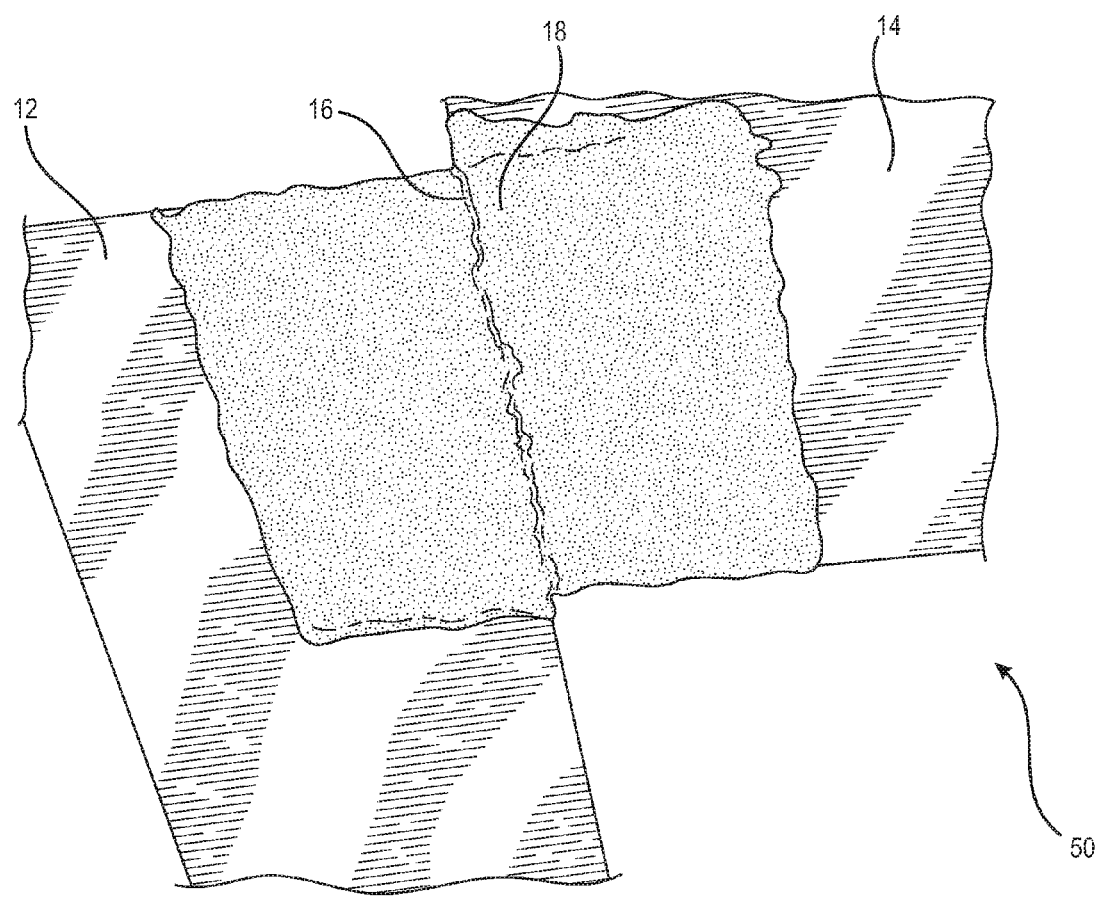
FIG. 3E depicts the assembly of FIG. 3D after failing.

FIG. 3B depicts a sheer test set up for an assembly with the present flexible adhesive composition, generally 40. An assembly comprising the panels 12 and 14, treated with the present flexible adhesive composition 22 over the joint seam. After the present flexible adhesive composition 22 dries, the two-panel assembly 40 is placed into an UTM between two bars 42. The UTM pushes bars 42 toward each other. The direction of movement for each of the two bars 42 is shown with arrows. At some point in the test, enough force is applied such that the two panels 12 and 14 are dislocated. This point of failure for the seam of FIG. 3B is shown in FIG. 3C from which it can be appreciated that the panels 12 and 14 are now pushed together and dislocated. As a control for the sheer test with the present flexible adhesive composition, the sheer test is conducted with the same two panels 12 and 14, but joined by joint reinforcement tape 18 instead of the present flexible adhesive composition. The set up for this test is shown in FIG. 3D and the point of failure for the control joint reinforcement tape assembly 50 is shown in FIG. 3E.

It has been discovered that the present flexible adhesive composition can withstand a pressure load equal or even larger than an assembly in which a conventional joint reinforcement tape is used.

Figure 4A:
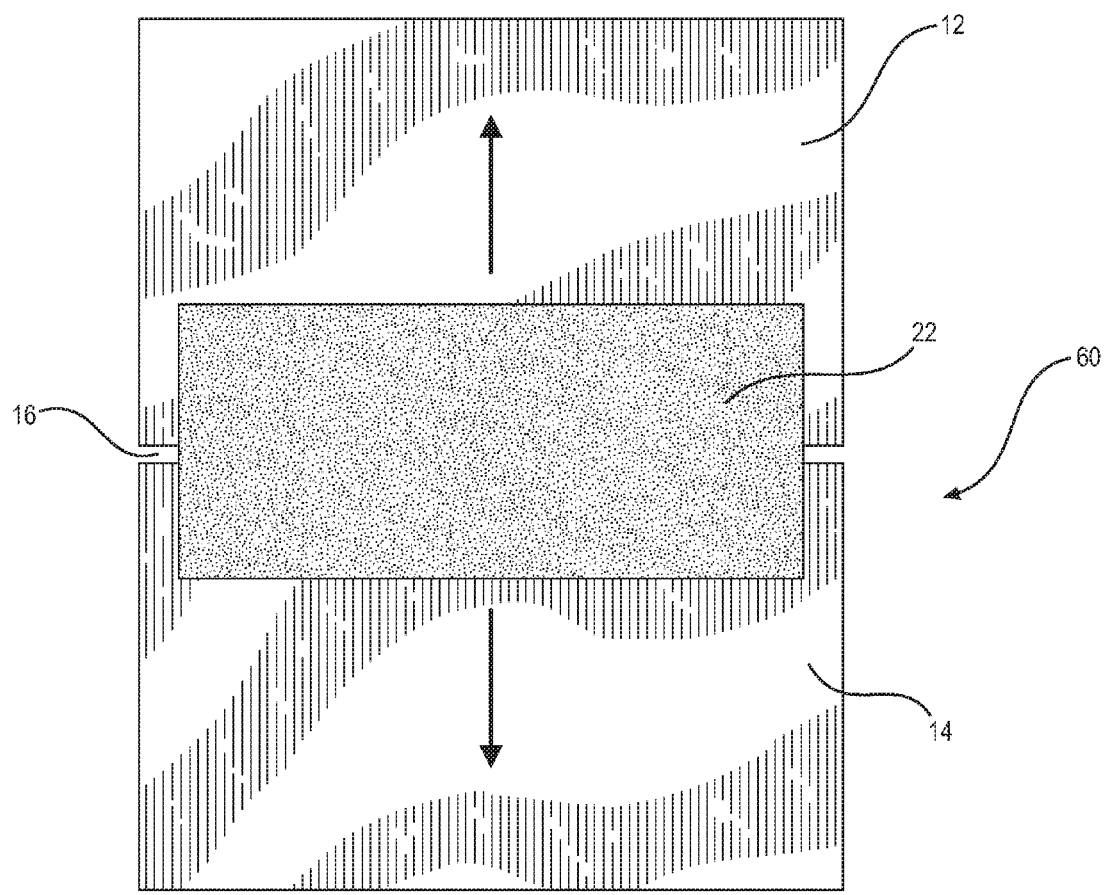
FIG. 4A is a schematic of the extension test set up.

Another test, known as the extension test, can also be conducted to measure the strength of a joint between two panels. The set up for the extension test, generally 60, is shown in FIG. 4A. As can be appreciated from FIG. 4A, a first panel 12 and a second panel 14 are placed together side-by-side, creating a joint seam 16. The present flexible adhesive composition 22 is then applied over the joint seam and is allowed to dry. As a control, the joint seam can be reinforced with a conventional joint reinforcement tape and joint compound instead of the present flexible adhesive composition (not shown). The assembly 60 is then placed between the bars 42 in the UTM, and the UTM is set to pull the panels 12 and 14 in opposite directions as shown by arrows in FIG. 4A. The UTM measures and reports the amount of force (load) needed to separate the panels 12 and 14. Thus, the adhesion strength of the present flexible adhesive composition can be calculated using the data obtained in the extension test.

Figure 4B:
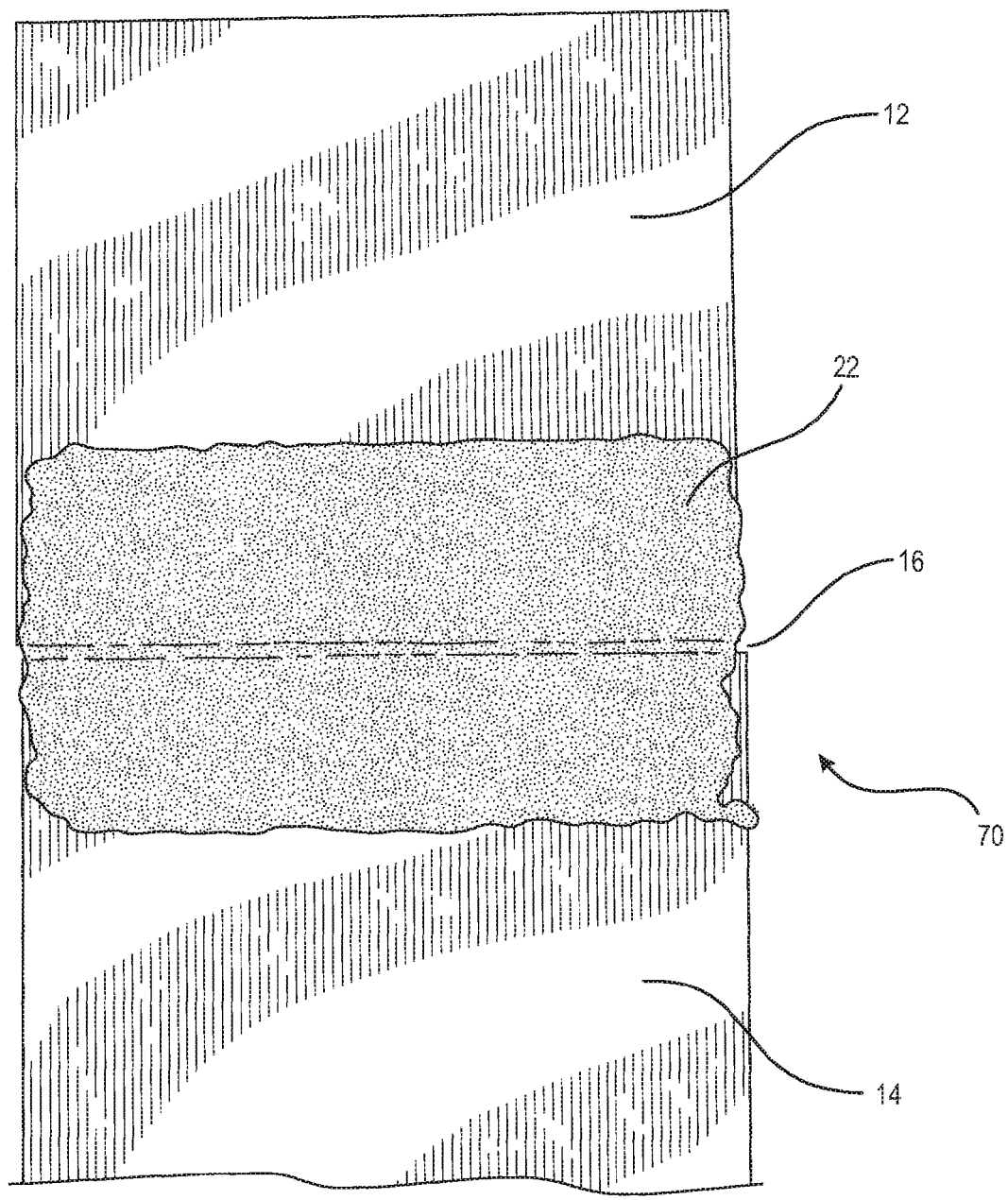
Figure 4C:
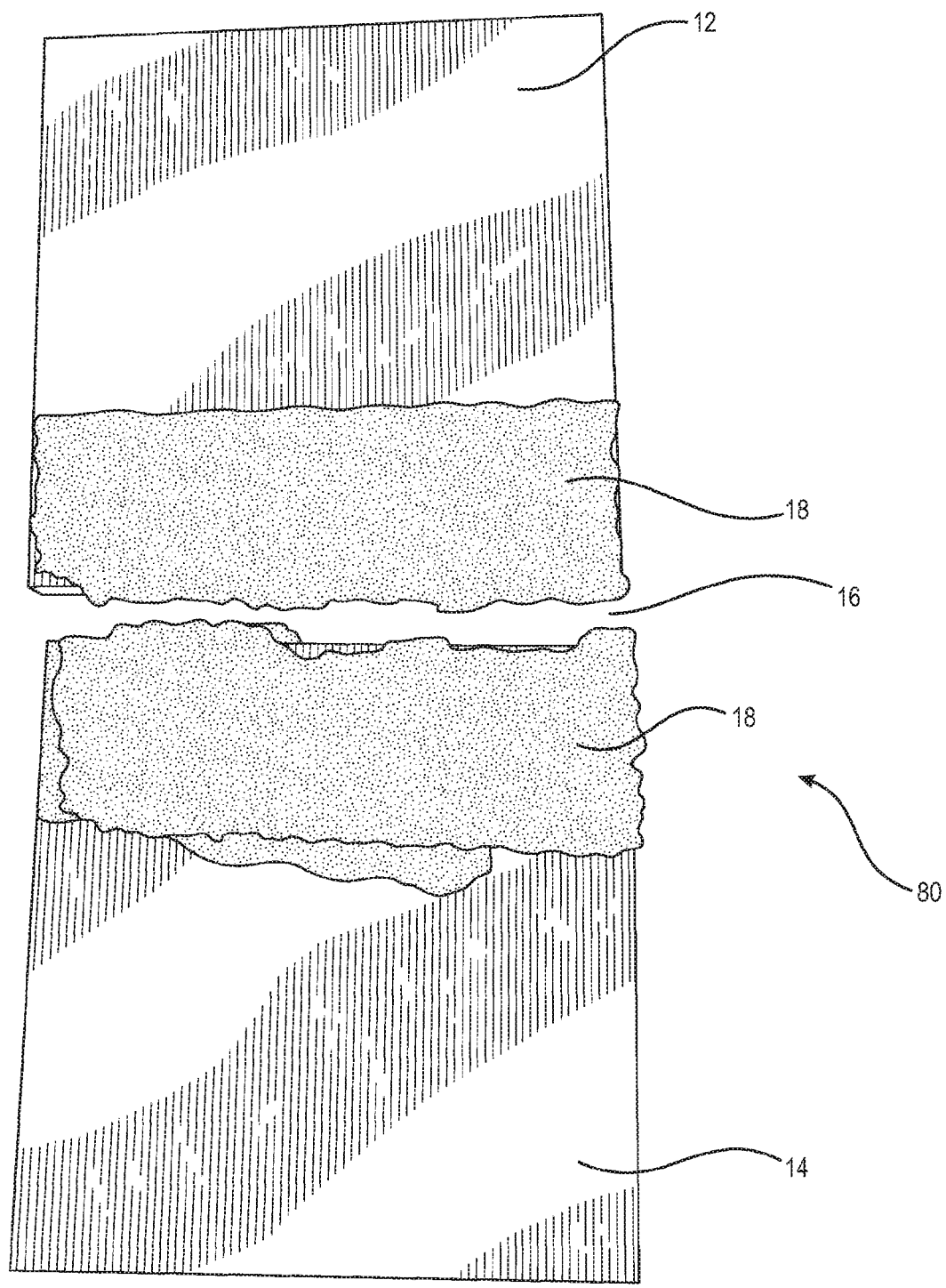
FIG. 4C depicts a control assembly with joint reinforcement tape after the extension test has been performed to the point of failure.

FIG. 4B reports the results of the extension test, generally 70, for the panels 12 and 14 joined together with the present flexible adhesive composition 22. FIG. 4C reports the results of the extension test, generally 80, for the panels 12 and 14 joined together with conventional joint reinforcement tape 18 adhered to the panels 12 and 14 with a joint compound. It can be appreciated from FIG. 4B in comparison to FIG. 4C that the present flexible adhesive composition provides stronger adhesion between the two panels as certain force load has separated completely the two panels in control with joint reinforcement tape, but more force is needed to separate the two panels which are adhered with the present flexible adhesive composition.

It has been discovered that the present flexible adhesive composition is well suited for adhering construction panels and fortifying joints. This composition can be used instead of joint reinforcement tape, which saves time and makes wall installation more accurate and reliable as the pressure is distributed more evenly between different areas of a joint when the present flexible adhesive composition is used in part because the composition is self-leveling.

The present flexible adhesive composition is suitable in installation of various construction panels. These panels include, but are not limited to, gypsum wallboards, paperless gypsum panels and gypsum and/or cement based tiles. In some embodiments, joint seams are filled with the present flexible adhesive composition and the composition is allowed to self-level and create a polymerized matrix over the joint and some panel surface area.

The present flexible adhesive composition can be prepared from a kit at a construction site by mixing components such as fibers, a binder and filler, and other components together with water. In some other embodiments, the present flexible adhesive composition can be pre-made and stored on a shelf until needed.

Further embodiments provide construction methods in which panels may be affixed to a framing members and applying the present flexible adhesive composition over a joint between abutting panels. The present flexible adhesive composition is then allowed to dry and creates a polymerized matrix which comprises fibers. No conventional joint reinforcement tape is used. Instead, at least one coat of a joint compound is applied over the joint and is allowed to dry. The seam can be then sanded if needed, and is ready for decorative painting.

The invention will be now described in more detail by the way of the following non-limiting examples.

Example 1. Flexible Adhesive Composition

A composition was prepared by mixing together components as listed in Tables 1 and 2. All components were as shown in the second column of Table 2. The components were used in the amounts as shown in the preferred amount column (column 4) of Table 2.

Example 2. Joint Strength Tests

The sheer test was set up as shown in FIG. 3A. Two gypsum panels were brought together side-by-side and formed a joint seam. The joint seam was filled one time with the flexible adhesive composition of Example 1, using the 16 gauge screed guides.

As a control, a joint seam of two other panels was fortified by using 0.035 screed guides, all purpose joint compound was spread on the panel joint, and paper joint reinforcement tape was embedded. The preparation was allowed to dry, and a second layer of joint compound was placed on top of the tape, using 16 gauge scree guides.

The extension test was set up as shown in FIG. 4A. Samples were prepared with either the flexible adhesive composition or conventional joint reinforcement tape and joint compound, as described above in connection with the sheer test preparation.

After all samples were completely dried, they were subjected to the sheer test and the extension test in the UTM. All tests were repeated in triplicates, and the results are recorded in Table 3 below.

TABLE 3

Test Results

| | Control (ALL Purpose Joint Compound with Joint Reinforcement Paper Tape) | | | |
|---|---|---|---|---|
| | Sheer Test | | Extension | |
| | Net Displacement (Inch.) | Peak Load (LBS) | Net Displacement (Inch.) | Peak Load (LBS) |
| Test 1 | −0.044 | −133.79 | 0.092 | 203.72 |
| Test 2 | −0.09 | −112.68 | 0.084 | 173.44 |
| Test 3 | −0.075 | −121.54 | 0.086 | 193.59 |
| AVE. | −0.070 | −122.67 | 0.087 | 190.25 |

| | FLEXIBLE ADHESIVE COMPOSITION | | | |
|---|---|---|---|---|
| | Sheer Test | | Extension | |
| | Net Displacement (Inch.) | Peak Load (LBS) | Net Displacement (Inch.) | Peak Load (LBS) |
| Test 1 | −0.091 | −145.93 | 0.093 | 166.65 |
| Test 2 | −0.059 | −157.5 | 0.064 | 135.64 |
| Test 3 | −0.09 | −91.1 | 0.067 | 94.75 |
| AVE. | −0.080 | −131.51 | 0.075 | 132.35 |
| AVE. W/o Test 3 | −0.075 | −151.715 | 0.079 | 151.145 |

As can be appreciated from the results in Table 3, the flexible adhesive composition has a higher sheer stress load when compared to conventional joint finishing. The flexible adhesive composition also has a lower extension stress load when compared to conventional joint finishing.

What is claimed is:

1. A flexible adhesive composition comprising:
   fibers with the average length from 0.1 to 3 millimeters and a diameter from 5 microns to 25 microns, wherein the fibers contain polypropylene fibers, polyethylene fibers, rayon fibers, or any combination thereof, wherein the fibers are in the amount from 0.1% to 25% by weight, based on the total composition weight;
   a binder, wherein the binder is a polymeric resin;
   water in the amount from about 25% to about 75% by weight, based on the total composition weight;
   at least one thickener in the amount from about 0.1% to about 2% by weight, based on the total composition weight; and
   wherein the composition has a viscosity in the range from about 200 to about 600 Brabender units and a pH in the range from about 7.0 to about 12.

2. The composition of claim 1, wherein the composition further comprises a filler with a particle size in the range from 0.2 microns to 250 microns and selected from the group consisting of calcium carbonate, limestone, gypsum, nepheline syenite, titanium dioxide, lithophone, wollastonite, bismuth oxychloride, talc, clay, and any mixture thereof, and wherein the filler is in the amount from 0.5% to 75% by weight, based on the total composition weight.

3. The composition of claim 1, wherein the fibers are at least one of the following: high-density polyethylene fibers and rayon denier fibers.

4. The composition of claim 1, wherein the fibers have the average length from 0.5 to 1.5 millimeters.

5. The composition of claim 1, wherein the polymeric resin is a film-forming polymer selected from the group consisting of ethylene vinyl acetate, styrene/acrylic polymers, acrylic polymers, polyurethane polymers, vinyl/acrylic polymers, and any mixture thereof.

6. The composition of claim 1, wherein the binder is a latex resin and wherein the composition further comprises a coalescent solvent.

7. The composition of claim 1, wherein the thickener is selected from the group consisting of cellulosic thickeners, gelling clays, associative thickeners and any combination thereof; and wherein the associate thickener comprises a hydrophobically modified ethoxylated urethane (HEUR), hydrophobically modified alkali-swellable emulsion (HASE), styrene-maleic anhydride terpolymer (SMAT), acidic acrylate copolymer of ethyl acrylate and methacrylic acid, acrylic terpolymer of ethyl acrylate, methacrylic acid, and/or nonionic urethane surfactant monomer.

8. The composition of claim 1, wherein the thickener is a combination of a cellulosic thickener in the amount from about 0.01% to about 2% by weight, based on the total composition weight, a gelling clay in the amount from about 0.01% to about 3% by weight, based on the total composition weight, and an associative thickener in the amount from about 0.1% to about 10% by weight, based on the total composition weight.

9. The composition of claim 1, wherein the composition comprises at least one biocide in the amount from about 0.05% to about 0.2% by weight, based on the total composition weight.

10. The composition of claim 1, wherein the composition further comprises at least one of the following compound: surfactant, dispersant, humectant.

11. The composition of claim 1, wherein the binder is in the amount from 1% to 50% resin solids, based on the total composition weight.

12. A wall assembly comprising of two panels which are joined together side-by-side and thereby create a joint seam and the flexible adhesive composition of claim 1 being applied over the joint seam.

13. The wall assembly of claim 12, wherein the panels are gypsum wallboards, paperless gypsum panels, and gypsum and/or cement based tiles.

14. The wall assembly of claim 12, wherein the panels are gypsum wallboards.

15. The wall assembly of claim 12, wherein the assembly does not include joint reinforcement tape.

16. A method for affixing and holding two panels together at a joint seam, the method comprising:
   creating a joint seam by positioning two panels side-by-side such that the panels abut; and
   applying the flexible adhesive composition of claim 1 to the joint seam and some panel surface area around the seam.

17. The method of claim 16, wherein the flexible adhesive composition is allowed to dry and create a polymeric film, and at least one coat of a joint compound is then applied over the polymeric film.

18. The method of claim 16, wherein the method is performed without joint reinforcement tape.

19. The method of claim 16, wherein the flexible adhesive composition is spray-applied.

20. The method of claim 16, wherein the panels are gypsum wallboards.

\* \* \* \* \*